United States Patent [19]

Wieland

[11] Patent Number: 5,507,562
[45] Date of Patent: Apr. 16, 1996

[54] EXTENSIBLE FOOT REST

[75] Inventor: Cliff Wieland, Syracuse, Ind.

[73] Assignee: Wieland Designs Inc., Goshen, Ind.

[21] Appl. No.: 281,923

[22] Filed: Jul. 28, 1994

[51] Int. Cl.$^6$ .................................................... A47C 7/50
[52] U.S. Cl. .......................... 297/423.2; 297/423.26; 297/423.3
[58] Field of Search ........................ 297/423.2, 423.3, 297/423.26, 423.28

[56] References Cited

U.S. PATENT DOCUMENTS

| | | | |
|---|---|---|---|
| 2,480,300 | 8/1949 | Luketa | 297/423.2 |
| 2,481,133 | 9/1949 | Luketa | 297/423.2 |
| 2,481,970 | 9/1949 | Bell | 297/423.2 |
| 2,533,595 | 12/1950 | Luketa | 297/423.2 |
| 3,794,381 | 2/1974 | Caldemeyer | 297/423.22 |
| 3,869,169 | 3/1975 | Johnson et al. | 297/423.2 |

*Primary Examiner*—Peter M. Cuomo
*Assistant Examiner*—Anthony D. Barfield
*Attorney, Agent, or Firm*—Baker & Daniels

[57] ABSTRACT

An extensible foot rest for a seat of the type used in a van, motor home, or other motor vehicle includes a foot support which is extended and retracted by sliding brackets slidable on rails mounted under the seat. A drive screw is operated by an electric motor to extend and retract the foot support. Pivoting links are provided to rotate the foot support from a generally vertical orientation to a substantially horizontal orientation as the foot support is extended to thereby support the feet and legs of the user seated in the seat.

9 Claims, 4 Drawing Sheets

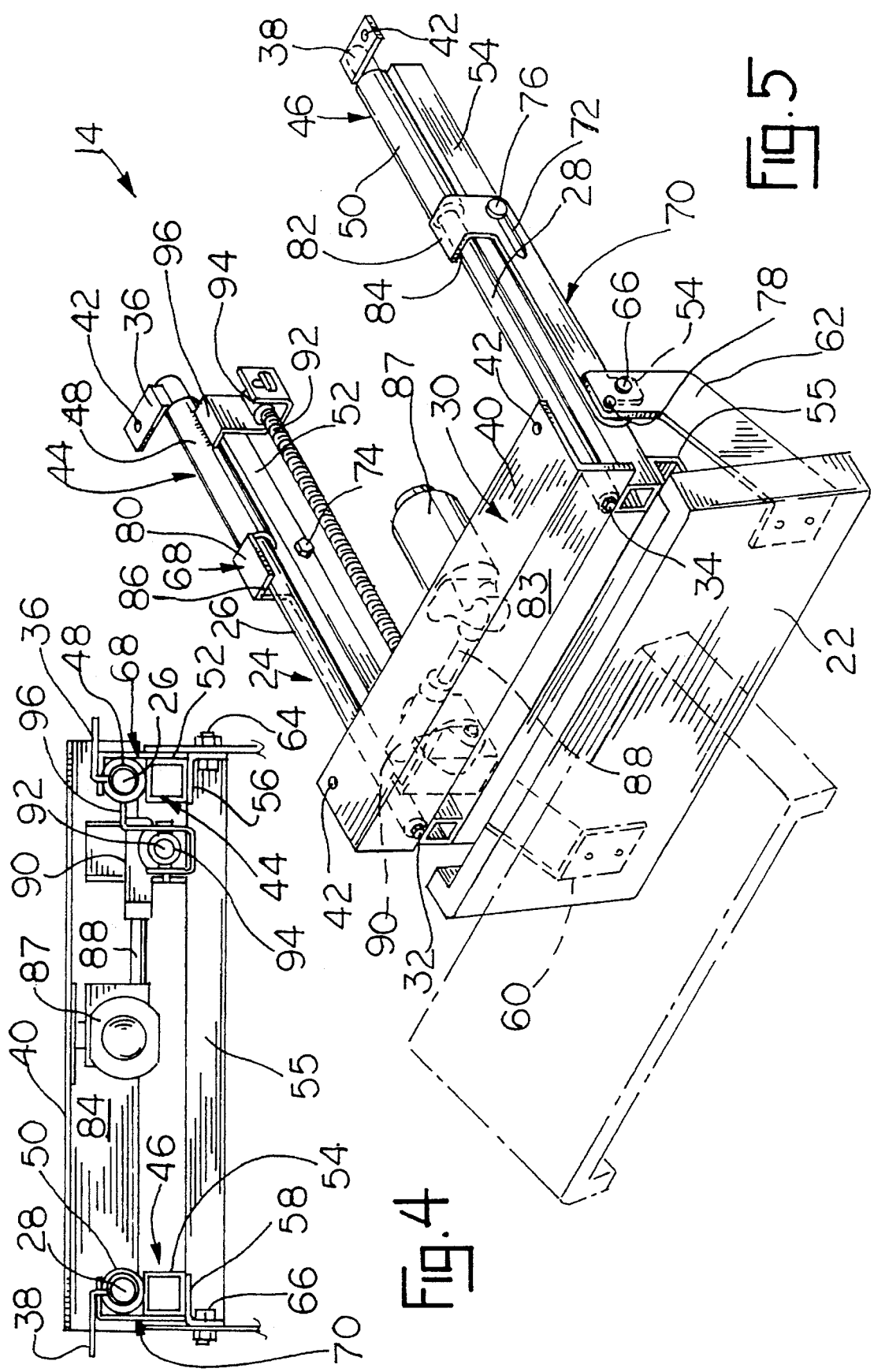

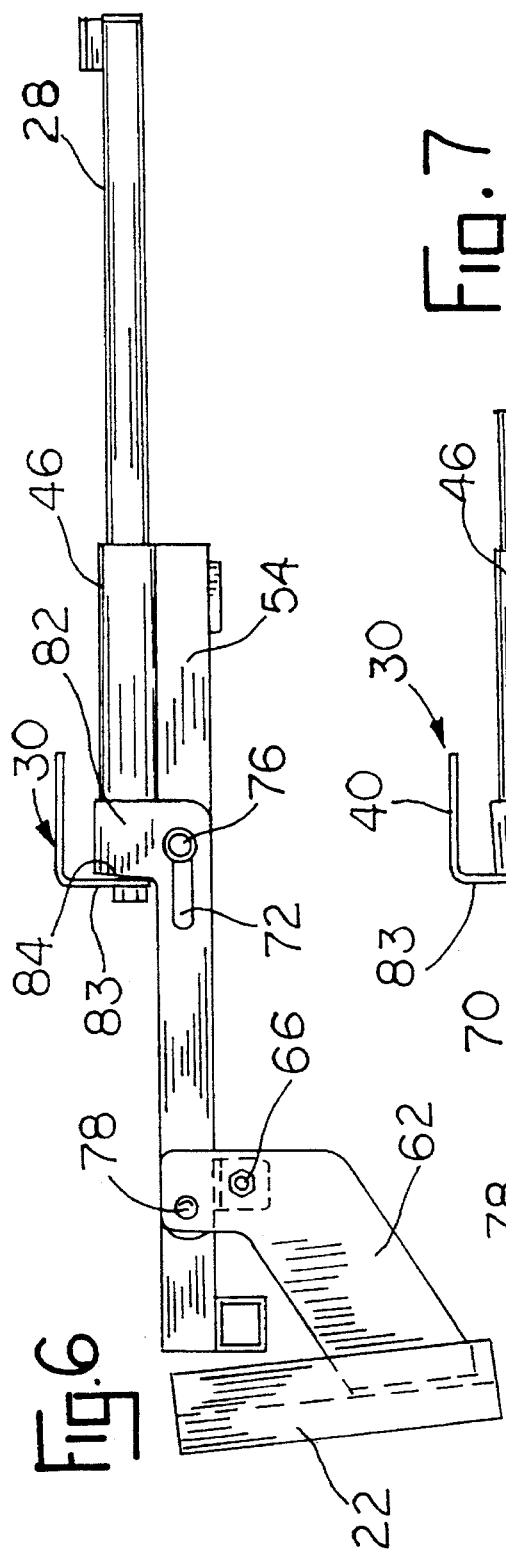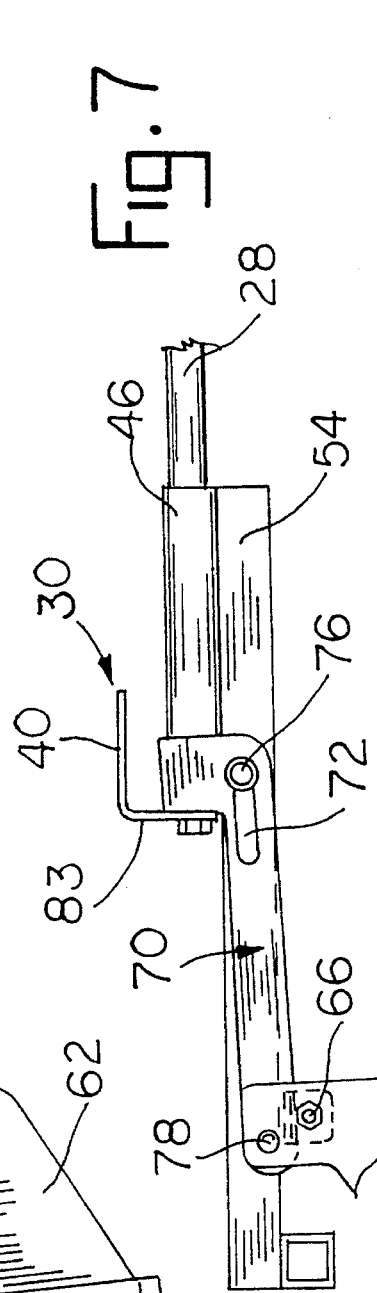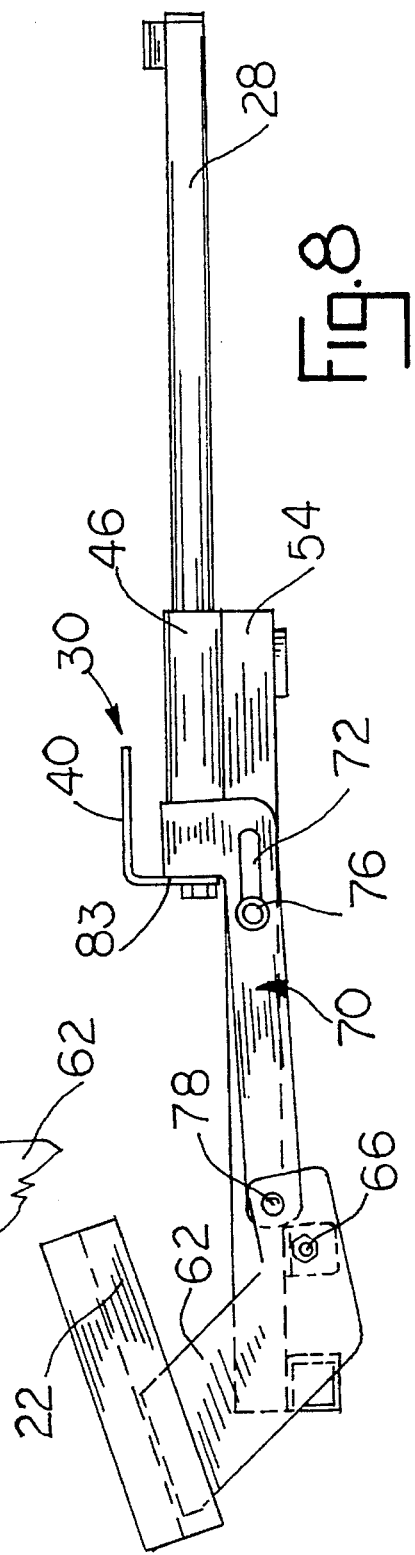

EXTENSIBLE FOOT REST

This invention relates to an extensible foot rest for a seat used in a conversion van, motor home, or other vehicle.

Seating used in motor vehicles must meet Federal Motor Vehicle Safety Standards in that they must be securely attached to the vehicle so that the seating will not be easily dislodged during a collision. This requires seat mounts that attach the seat to the vehicle that are relatively large, and have heretofore precluded use of extensible foot rests for vehicle seating. Extensible foot rests have been available for many years for household seating, but because of the lack of room due to the structural seat mounts required in motor vehicles, there has not been room to attach a foot rest to seats used in motor vehicles.

The present invention provides an extensible foot rest for use with seating of the type primarily used in conversion vans, motor homes and other vehicles. The foot rest is mounted on a pair of sliding brackets which are slidably supported on rails which extend below the side edge portions of the seat. The support bracket includes a transverse member that interconnects the rails and supports an electric motor which is connected to the sliding brackets through a screw drive to advance and retract the brackets along the rails. A pair of pivoting brackets move with the sliding brackets until the foot rest is almost fully extended, whereupon the pivoting brackets pivot the foot rest from a generally vertical to a generally horizontal position, to thereby support the feet and legs of the user seated in the seat. Since the support bracket extends only under the side and front edges of the seat, the bulk of the space underneath the seat is available for the necessary mounts that are used to attach the seat to the vehicle. Accordingly, the present invention has the advantage of providing an extensible foot rest for a seat that may be used in motor vehicles and mounted to the latter by mounts that meet governmental safety requirements. Another advantage of the present invention is that the foot rest may be quickly and easily extended when desired by operation of an electric motor. Still another advantage of the present invention is that the entire drive mechanism is mounted under the seat, where it can by easily concealed by conventional methods.

Although the invention will herein be described with reference to a single person seat, it will be recognized by those skilled in the art that the foot rest according to the present invention may be made any desired length by simply elongating the transverse support bracket and the foot rest, thereby permitting the present invention to also be used for multiple person seating, such as the sofas commonly used in van conversions and other recreational vehicles. If necessary, additional drive mechanisms may be provided to provide necessary actuation power.

These and other advantages to the present invention become apparent from the following description, with reference to the accompanying drawings, in which:

FIG. 4 is a view taken substantially along the lines of 4—4 of FIG. 2;

FIG. 5 is a view in perspective of the extensible foot rest mechanism illustrated in FIGS. 2–4;

FIG. 6 is a view similar to FIG. 3 but illustrating the positions of the brackets and rails just before the foot rest begins pivoting into the horizontal position;

FIG. 7 is a view similar to FIG. 6 but illustrating the rails and brackets in positions they assume just as they advance beyond the position illustrated in FIGS. 6; and FIG. 8 is a view similar to FIG. 6 but illustrating the foot rest as it is fully pivoted into a substantially horizontal position.

Figure 1:
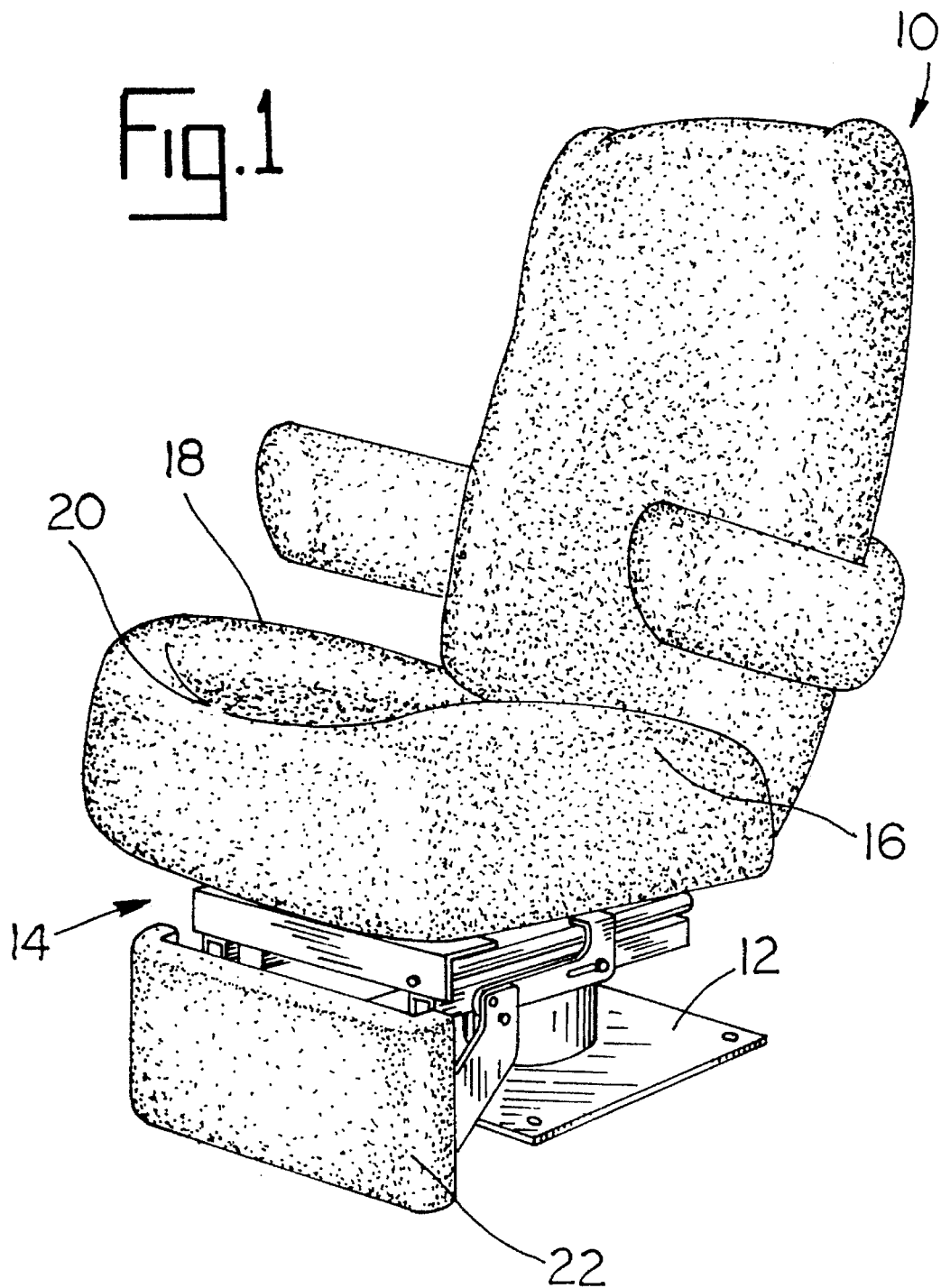
FIG. 1 is view in perspective of a vehicle seat which incorporates the extensible foot rest pursuant to the present invention.
Figure 2:
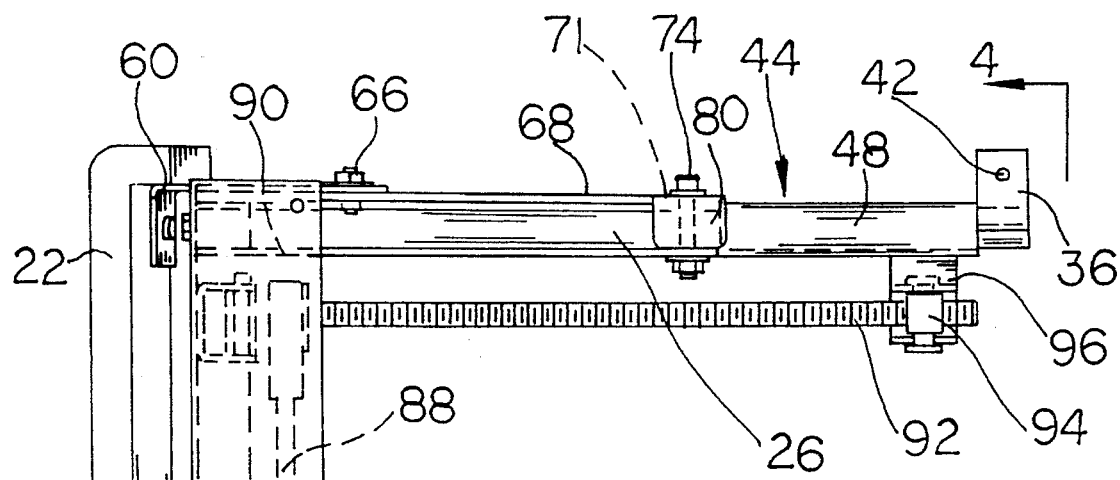
FIG. 2 is a top plan view of the extensible foot rest mechanism used with the motor vehicle seat illustrated in FIG. 1.
Figure 3:
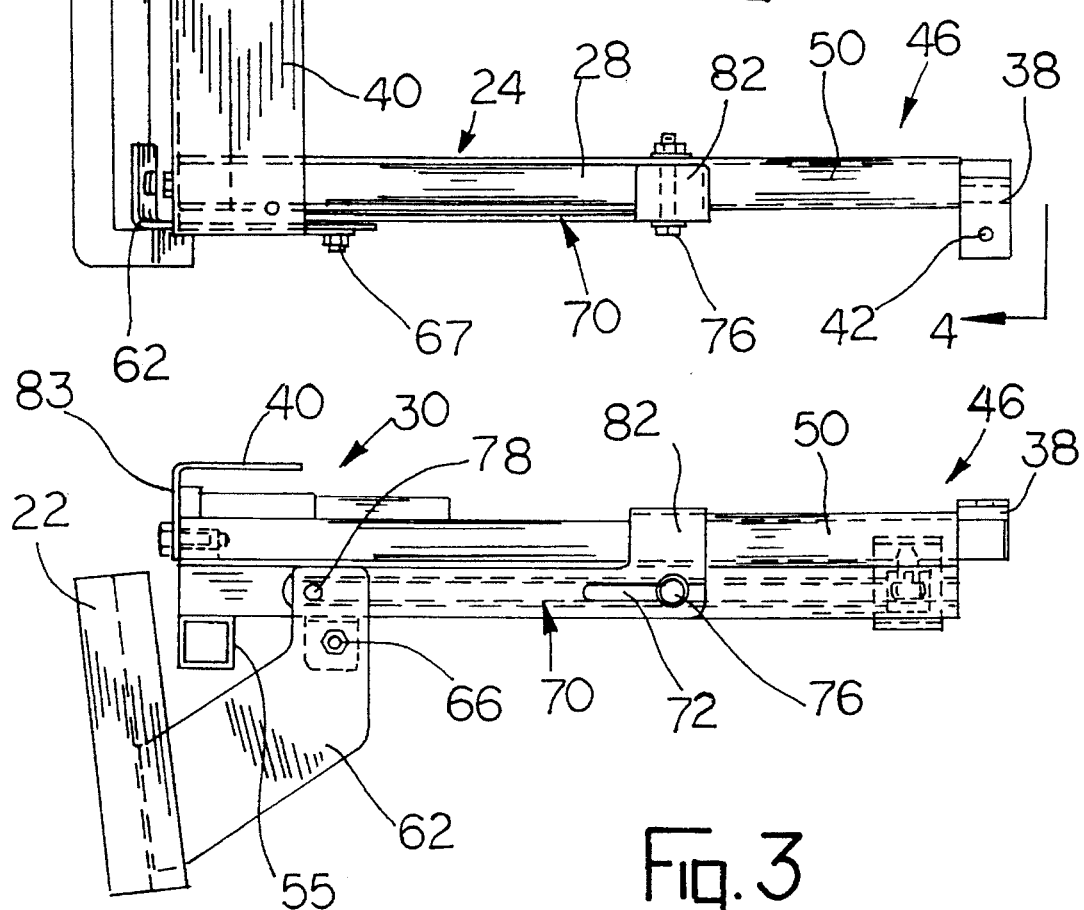
FIG. 3 is a side view of the foot rest mechanism illustrated in FIG. 2.

Referring now to the drawings, a seat generally indicated by the numeral 10 is supported on a mount 12 which is mounted to the floor of a motor vehicle and engages the underside of the seat 10 to support the seat 10 within the vehicle in a manner that conforms with Federal Motor Vehicle Safety Standards as discussed above. The seat 10 is provided with an extensible foot rest mechanism generally indicated by the numeral 14 which is made according to the present invention. The seat 10 includes side edge portions 16, 18 and a front edge portion 20. The extensible foot rest assembly 14 is illustrated in FIG. 1 in its retracted position in which foot support 22 is disposed generally below the front edge portion 20 of the seat 10.

The foot rest assembly 14 includes a support bracket 24 including a pair of rails 26, 28 and a transverse support bracket 30 which extends transversely between the rails 26, 28. Fasteners 32, 34 secure one end of the rails 26, 28 through the transverse support brackets 30. Hangers 36, 38 are secured to the opposite ends of the rails 26, 28, and secure the rails 26, 28 to the side edge portions of the underside of seat 10, which are immediately below the side edge portions 16, 18. Transverse support bracket 30 includes a flange 40 which is drilled at 42 as are the hangers 36, 38 to receive fasteners to secure the support bracket 24 to the underside of the seat 10, immediately below the front edge portion 20 underneath the seat 10 as illustrated in FIG. 1. Accordingly, the rail 28 extends below the side edge portion 16 of seat 10; the rail 26 is secured below the opposite side edge portion 18 of seat 10, and the transverse support bracket 40 extends below the front edge portion 20 of the seat 10.

A sliding bracket generally indicated by the numeral 44 is slidably mounted on the rail 26, and a sliding bracket generally indicated by the numeral 46 is slidably mounted on the rail 28. Each of the brackets 44, 46 includes a sliding hanger 48, 50 which slides on the corresponding rail 26 or 28. Each of the sliding hangers 48, 50 carry elongated members 52, 54 which extend from the hangers 48, 50 coaxially with the rails 26, 28 toward the transverse support bracket 30. Each of the members 52, 54 are secured to their corresponding hangers 48, 50 for movement therewith. A cross member 55 interconnects the members 52, 54. Flanged brackets 56, 58 are mounted on each of the elongated members 52, 54. Pivoting support arms 60, 62 are pivotally attached to the brackets 56, 58 by pivot pins 64, 66. The foot support 22 is secured to each of the brackets 60, 62 and extends therebetween. Accordingly, the foot support 22 is advanced from the seat 10 and retracted toward the seat 10 as the sliding brackets 44 and 46 are moved toward and away from the transverse support bracket 30.

A pair of pivoting links 68, 70 are each provided with an elongated slot 71, 72 which extend parallel to the axis of the rails 26, 28. The pivoting links 68, 70 are attached to their corresponding arms 52, 54 by pins 74, 76. The fasteners 74, 76 permit sliding movement of the pivoting links 68, 70 relative to the arms 52, 54 to the extent permitted by the length of the slots 71, 72. The pivoting links 68, 70 are pivotally attached to the pivoting support arm 60, 62 by pivot pins, only the pivot pin 78 connecting the pivoting link 70 to the pivoting support arm 62 being shown in the drawings. Each of the pivoting links 68, 70 is also provided with an extension 80, 82 which carries a stop surface 84, 86 which is adapted to engage vertically extending flange 83 of the transverse support bracket 30 to prevent further movement the pivoting links 68, 70 after the stop surfaces 84, 86 are advanced against the flange 83.

A conventional DC electric motor 87 is mounted on the flange 40 of the transverse support bracket 30, and is connected through a flexible shaft 88 and gear box 90. An elongated drive screw 92 extends substantially parallel to the rail 26 and arm 52 and is connected into the gear box 90 for driving by the motor 87. The drive screw 92 may be rotated in both clockwise and counterclockwise directions by reversing the motor 87. The drive screw 92 is threadingly engaged with a drive nut 94 which is attached to slidable hanger 48 by a bracket 96.

In operation, the foot rest 22 is illustrated in solid lines in FIG. 5 when the foot rest is disposed in a substantially vertical position retracted under the front edge portion 20 of the seat 10 and in phantom lines in the position which it assumes when it has been extended into a horizontal position for supporting the legs and feet of the user seated in the chair 10. When the user decides to extend the foot support 22 to the substantially horizontal position where the foot support 22 can support the feet and legs of the user, the user operates a switch causing the motor 87 to rotate the screw drive 92 in a direction which, because of the threaded connection between screw drive 92 and the drive nut 94, will cause sliding bracket 44 to advance towards the transverse support bracket 30. Since sliding bracket 44 is connected to sliding bracket 46 by the foot support 22, movement of the sliding bracket 44 by the screw drive 92 will also advance the sliding bracket 46 towards the transverse support member 30. It will be noted that it is within the scope of the invention to provide a second drive screw 92 and drive nut 94 for direct actuation of the sliding bracket 46. This is necessary, for example, if the invention is used on a seat for multiple persons, such as a sofa, in which the foot rest 22 extends or is substantially all the was across the vehicle. Preferably, both drive screws can be operated by the same motor 87, the second drive screw being operated through a second flexible drive shaft gear box, but it is within the scope of the invention to provide multiple motors to actuate multiple drive screws.

Referring now to FIGS. 6–8, it will be noted that the foot support 22 remains in its substantially vertical orientation as the foot rest is advanced away from the front edge portion 20 of the seat 10. FIG. 6 illustrates the foot rest 22 just before the stop surfaces 84, 86 contact the vertical flange 83 of transverse support brackets 30. In FIG. 7, the stop surfaces 84, 86 have fully contacted the flange 83. The extensions 80, 82 are designed such that the sliding hangers 48, 50 can pass below the extensions as the sliding brackets 44, 46 advance on the rails 26, 28 relative to the pivoting links 68, 70 once the stop surfaces have fully contacted the flange 83. As the sliding brackets 44, 46 move relative to the pivoting links 68, 70 after the stop surfaces 84, 86 have contacted flange 83, the pivot pins 74, 76 slide in the slots 72 as best illustrated in FIG. 8. As this occurs, the arms 52, 54 cause the pivoting support arms 60, 62 to pivot about the pivots 64, 66 as the pivoting links 68, 70 pivot about their pivots 78, to thereby cause the foot support 22 to rotate into the substantially horizontal position illustrated in FIG. 8. In this position, the foot support 22 is able to support the feet and legs of the user. When the user desires to retract the foot support 22, he operates a switch causing the motor 87 to drive the screw drive 92 in the opposite direction, thereby retracting the sliding brackets 44, 46 away from the transverse support bracket 30, to thereby return the foot support to its substantially vertical orientation tucked under the front edge portion 20 of the seat 10.

I claim:

1. Extensible foot rest and a seat, said seat having a front edge portion, a pair of side edge portions, and an underside, said underside having a front edge portion below the front edge portion of the seat and a pair of side edge portions below the side edge portions of the seat, a seat mount engaging the underside of said seat between said side edge portions of the underside and offset from said front edge portion of the underside for supporting said seat, said foot rest including a pair of side edge rails and a transverse support member interconnecting said rails and secured to each of said rails, attachment means for attaching said rails to the side edge portions of said underside such that the seat mount extends between said rails and for attaching said transverse support member to said front edge portion of the underside, a pair of sliding brackets slidably mounted on said rails, a foot support pivotally secured to each of said sliding brackets and extending across the front edge portion of the seat, an electric motor mounted on said transverse member, and drive means extending substantially parallel to said rails alongside said mount and connected to said motor and one of said brackets, said brackets sliding along said rails in response to operation of said motor from a retracted position at the front edge portion of the seat to an extended position extended from the front edge portion of the seat to support the feet and legs of the user seated in said seat.

2. Extensible foot rest and seat as claimed in claim 1, wherein said foot rest is pivotally connected to said sliding brackets, and means for pivoting said foot rest from a substantially vertical to a substantially horizontal orientation as said foot support approaches said extended position.

3. Extensible foot rest and seat as claimed in claim 2, wherein said pivoting means including a pair of pivoting links slidably connected to a corresponding one of said sliding brackets, each of said pivoting links being pivotally connected to said foot support and sliding with said sliding brackets as said sliding brackets advance along said rails, said pivoting links pivoting said foot support after moving with the sliding brackets for a predetermined distance without pivoting said foot support.

4. Extensible foot rest and seat as claimed in claim 3, wherein said pivoting links include stop means for stopping movement of the pivoting links along said rails, said pivoting links moving with the sliding brackets until said stop means stops movement of the pivoting links, and sliding connecting means providing a sliding connection between the sliding brackets and the pivoting links for permitting further advance of the sliding brackets along the rails after said stop means stops movement of the links with the sliding brackets to thereby pivot said foot support about the pivoting connection with the pivot links.

5. Extensible foot rest and seat as claimed in claim 4, wherein said stop means includes a stop surface on said each of said pivoting links and stop surfaces on said support bracket for engagement by the stop surface each of the pivoting links.

6. Extensible foot rest and seat as claimed in claim 4, wherein said sliding connecting means includes a slot and a projection received in said slot.

7. Extensible foot rest and seat as claimed in claim 1, wherein said drive means includes a drive screw extending substantially parallel to said one rail, means for drivingly connecting said drive screw to said motor for rotation thereby, and a drive nut attached to said one sliding bracket and threadedly connected to said drive screw whereby rotation of said drive screw advances and retracts said drive nut toward and away from said motor, thereby causing said sliding brackets to slide along said rails.

8. Extensible foot rest and a seat, said seat having a front edge portion and a pair of side edge portions, said foot rest including a support bracket mounted under said seat, said support bracket including a pair of side rails, each of said side rails being mounted under said seat and extending below a corresponding side edge portion of the seat, a pair of sliding brackets slidably mounted on said rails, a foot support secured to each of said sliding brackets and extending across the front edge portion of the seat, and drive means for sliding said sliding brackets along said rails to extend said foot support from a retracted position at the front edge portion of the seat to an extended position extended from the front edge portion of the seat for supporting the feet and legs of the user seated in said seat, said support bracket including a transverse member interconnecting said rails and extending under the front edge portion of the seat, said foot support extending substantially parallel to said transverse member, said drive means including an electric motor mounted on said transverse member, and means for drivingly connecting said electric motor to one of said sliding brackets for sliding said sliding brackets along the rails, said drivingly connecting means including a drive screw extending substantially parallel to said one rail, means for drivingly connecting said drive screw to said motor for rotation thereby, and a drive nut attached to one of said sliding brackets and threadedly connected to said drive screw whereby rotation of said drive screw advances and retracts said drive nut toward and away from said motor, thereby causing said sliding brackets to slide along said rails, said foot support being pivotally mounted on said sliding brackets, and a pair of pivoting links slidably connected to a corresponding one of said sliding brackets, each of said pivoting links being pivotally connected to said foot support and sliding with said sliding brackets as said sliding brackets advance along said rails, said pivoting links pivoting said foot support after moving with the sliding brackets for a predetermined distance without pivoting said foot support.

9. Extensible foot rest and seat as claimed in claim 1, wherein said pivoting links include stop means for stopping movement of the pivoting links along said rails, said pivoting links moving with the sliding brackets until said stop means stops movement of the pivoting links, said stop means includes a stop surface on said each of said pivoting links and cooperating stop surfaces on said transverse member.

* * * * *